3,230,131
ALLYL RESIN LAMINATES

Richard M. McFarland, Westport, Conn., assignor to FMC Corporation, a corporation of Delaware
No Drawing. Filed Apr. 27, 1961, Ser. No. 105,865
4 Claims. (Cl. 156—332)

This invention relates to an improved process for the manufacture of laminates, and to the novel products produced thereby, of enhanced properties and utility. Particularly, this invention relates to improvements in laminates having a decorative or otherwise printed paper sheet laminated to a rigid core material, wherein the laminating binder is a diallyl phthalate resin.

Decorative laminates, in general, comprise an external coating of printed paper laminated to a core which has the properties of strength and workability required for the particular end use. As bonding agent for decorative laminates is used, ideally, a resinous material which penetrates the paper and is adhesive to the core, and which also forms a protective film over the paper, thereby guarding the paper against abrasion and physical and chemical attack. The laminating resin should also impart a hard, attractive surface to the laminate. In copending United States application Serial No. 824,766, filed July 3, 1959, now Patent No. 3,049,458, is described a process for producing such a laminate, whereby a sheet of standard decorative paper in a matrix of diallyl phthalate resin is laminated directly to a core material of appropriate strength and rigidity for the application desired. The preparation of these laminates was made possible by the discovery that a relatively small change in diallyl phthalate resin content in the impregnated paper produced a remarkable change in the thickness, and in fact the very existence, of a resin film on the surface of the decorative paper.

In general, laminates produced by the process described in application Serial No. 824,766 have durable, attractive surfaces, free of the defects of "dull spots" and pitting, and unaffected by moisture, solvents or harsh chemicals. However, even that process is accompanied by occasional practical difficulties. For example, when standard decorative papers are used in the production of large size diallyl phthalate resin laminates, it is sometimes difficult to obtain a uniform high gloss finish over the entire surface of the laminate; the surface may have dull areas, apparently caused by paper fibers lying closer to the surface in some areas than in others, as if there were variations in the paper thickness, so that an excess of resin film would appear in areas where the paper seemed to be thinner, and a deficiency of resin in areas where the paper seemed to be thicker. Examination of such decorative papers showed, however, that the papers were of essentially uniform thickness.

I have now discovered that the dull areas sometimes appearing on otherwise glossy diallyl phthalate laminate surfaces occur because standard machine finish decorative papers, although of uniform cross-section, tend to lay in the resin matrix in a somewhat wavy line. I have found that a significantly improved laminate is obtained by densifying or "supercalendering" the decorative papers prior to saturation with the diallyl phthalate resin laminating solution. This simple procedure serves not only consistently to eliminate dull areas, thus substantially improving the processing aspects of these products on a commercial scale, but is accompanied by other unexpected advantages. For example, the use of papers of substantially greater density than standard machine-finish papers apparently minimizes resin flow through the paper, so that the paper lies flat against the core, rather than being suspended in a resin matrix which separates the paper from the core. This minimization of resin flow also acts to reduce resin loss into the core, resulting in greater resin film thicknesses on the surface of the paper for a given amount of impregnating resin, and improved abrasion resistance.

Another important result of the process of this invention is the improved laminate surface appearance, probably due to the flatter decorative paper lay-down and lower resin loss to the core. Further, an exceptionally uniform resin distribution across the top of the printed decorative surface is obtained, providing more uniform wear, with higher wear resistance, than characterize the products of standard machine-finish decorative papers. In addition, these improvements permit the use of diallyl phthalate decorative laminate constructions with core materials that would tend to be too absorbent using standard non-supercalendered base papers.

The densified decorative papers of this invention are obtained by densifying standard machine-finish papers two to four fold. This is accomplished on a commercial scale by a process called "supercalendering." The usual calendering process in paper manufacture produces so-called "machine finish" papers, formed by passing the paper as it is formed, from water slurries on a Fourdiner machine, through a series of metal rolls. Supercalendering essentially carries this process further, and is effected by using alternating metal and resilient surfaced rolls in pairs. This process functions to produce a polishing or friction action, and both to densify the paper and to smooth one side preferentially. This process is well known in the paper making art, and is discussed, for example, in the book "Modern Pulp and Paper Making," third edition, Calkin and Witham, Reinhold, New York (1957), pp. 392–395.

These densified papers are normally alphacellulose, absorbent papers, pigment-loaded for opacity, printed either before or after supercalendering with solvent-resistant and heat resistant inks. These papers may be characterized further by their Densometer readings. The Gurley Densometer is the standard device for measuring porosity of paper. Supercalendered paper has a Densometer reading of 250–450 seconds per 400 ml., whereas standard machine finish paper has a Densometer reading of 30–80 seconds per 400 ml. Papers of either 3–4 mils thickness (5 mils before supercalendering) having a basis weight of 60–65 pounds per 3000 square feet, or 7–8 mils thickness (9 mils before supercalendering) having a basis weight of 90–105 pounds per 3000 square feet, are available in commerce and are usable in the instant invention.

The decorative laminates of this invention are obtained briefly, by impregnating supercalendered decorative paper with a solution comprising (a) diallyl phthalate, 90–98% of said diallyl phthalate being a thermoplastic diallyl phthalate polymer and the other 2–10% being diallyl phthalate monomer, (b) a catalytic amount of an organic peroxide, (c) an effective amount of a release agent and (d) a volatile solvent, and drying said impregnated paper, until said paper is impregnated with a total of about 53 to 67% of diallyl phthalate, by weight of paper, and has a residual volatile content of less than 8%, measured as material volatile after heating the dried paper for 10 minutes at 320° F.; laminating the dried impregnated paper to the surface of said board, at a temperature and pressure and for a time sufficient to convert the diallyl phthalate to a thermoset resin, thereby forming a laminate coated with a resin surface of about 3 to 6 mils in thickness. The specific proportion of diallyl phthalate used depends on the thickness of the decorative paper employed. When decorative paper of 3–4 mils thickness contains 63 to 67%, by weight of imprgenated paper, of total diallyl phthalate, or when decorative paper of 7–8 mils thickness contains 53 to 57% of diallyl phthalate, the laminated product has a uniform, adherent surface coating, about 3 to 6 mils in thickness, of thermoset diallyl phthalate resin of any desired finish. This coating 3 to 6 mils thick is in marked contrast to the coating of 1 to 3 or 4 mils obtained when standard machine finish paper is impregnated with an identical resin formulation to an identical resin content. With the densified papers used herein, not only is a consistently thicker resin coating obtained, but the resin film on the surface of the cured laminate, accompanied by a highly glossy and durable surface, is unusually even in cross-section and free of discontinuities. The adhesion of the supercalendered paper to the core, rather than suspension of the paper inside the resin matrix, is perhaps the most outstanding difference between these two papers. Because of the use of densified paper, consistently excellent results are obtained, completely free of defects, so that the number of rejects in commercial operations is remarkably low. The resinous component of the laminate is derived from thermosetting polymers of diallyl phthalate. Diallyl phthalate polymerizes by addition polymerization through the allylic unsaturation, first forming a soluble, thermoplastic polymer which is relatively stable and is soluble in a wide variety of organic solvents, and which on further polymerization is changed to an infusible, insoluble thermoset resin having excellent physical and chemical properties. Polymers of diallyl and dimethallyl orthophthalate and isophthalate are preferred for use herein. These polymers are generally described as diallyl phthalate in the following description, which applies equally to all of these polymers.

Thermoplastic diallyl phthalate resin may be prepared by standard polymerization techniques, such as emulsion, solution or bulk polymerization, usually with a peroxide catalyst. The polymerization reaction is relatively slow, and may be stopped before gelation of the polymer, by procedures such as lowering the temperature or quenching the reactants, or destroying the catalyst, to form a thermoplastic polymer which contains residual vinyl unsaturation and is soluble in such common solvents as low molecular weight ketones, dioxane, ethyl acetate, and benzene. The molecular weight of the thermoplastic polymer is generally in the range of about 2500 to 25,000, with a number average below 10,000. Processes useful for the preparation of this polymer are described in U.S. Patents 2,370,578 and 2,377,095.

To obtain the beneficial results described herein, about 90% to 98% of the diallyl phthalate used in impregnating the decorative paper should be in the form of this thermoplastic polymer, and the remaining 2% to 10% as monomer. At over 95% polymer, slightly higher pressures may be needed for adequate flow during curing, to avoid pitting and flaking of the surface. At less than 90% polymer, the dried paper becomes sticky.

Present also in the impregnating solution is a catalytic amount, normally about 2% to 5%, by weight of diallyl phthalate, of an organic peroxide, to catalyze the final cure of the resin. There is no advantage to the use of more than 5% catalyst. At least about 1% catalyst is required for complete cure. This catalyst may be any organic peroxide or hydroperoxide, such as tertiary butyl perbenzoate, benzoyl peroxide, tertiary butyl hydroperoxide, and other catalysts which are effective at the curing temperature but do not decompose during the drying cycle of the impregnated paper.

It is also preferable to include an effective amount, normally about 2% to 5%, by weight of diallyl phthalate, of an internal parting agent, such as lauric acid, carnauba wax or beeswax. External release agents or other processing techniques may also be used.

To prepare the laminates of this invention, all of these components are first dissolved in a volatile solvent, which may be any of the usual solvents useful for dissolving diallyl phthalate polymer. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, other solvents such as dimethyl formamide, and many other solvents which can be evaporated out after impregnation of the paper. It may be preferred to use a mixture of solvents, in order to control the rate of evaporation from the paper. Solutions ranging from about 25% to 70% solids may be used, depending on the particular solvent system used. It is especially convenient to operate in the range of about 35% to 50% solids, for most solvents. The higher the resin concentration, the higher the resin pickup by the paper during impregnation. Since the viscosity of a solution of given resin content depends on the solvent, as well as do the temperature and rate at which the solvent may be evaporated off, the choice of solvent will depend to some extent on the particular processing technique which is adopted for preparing the laminating stock.

The decorative paper may be impregnated using conventional equipment and techniques, wherein the paper is passed through a tank containing the impregnating solution. The amount of resin pickup may be controlled by adjusting the rate of passing the paper through the solution, varying the type of solvent system employed and the percent solids in the impregnating solution, or using metering rolls, doctor blades, transfer rolls or other standard saturating techniques. The impregnation is conveniently carried out at room temperature, followed by evaporation of the solvent at elevated temperature.

Complete impregnation of the paper web is essential since improper saturation will result in the formation of pits and craters in the surface of the cured laminate, and may even result in delamination through the thickness of the paper. The amount of resin on the paper is readily determined by weighing samples of dried impregnated paper after each dip into the impregnating solution. Since heavily coated papers tend to adhere to the rolls of some types of coaters in commercial use, standard techniques, such as the use of a doctor blade on the unprinted side of the paper so that the thinner film dries rapidly enough not to stick to the rolls, may be employed in practice.

After the desired resin content has been obtained in the paper, the impregnated papers are dried to remove the volatile solvent. If the paper has been impregnated by a process requiring more than one dip through the laminating solution, at least a partial drying should be effected between successive dips. The drying temperature should be carefully controlled, to avoid premature cure of the resin at this stage. The drying temperature and time will, of course, depend on the amount of solvent to be removed, the solvent system used and the speed of the paper through the drying ovens. Drying should be carried out gradually, to avoid the formation of craters in the final product. Drying temperatures in the range of about 150 to 275° F., in a two zone system, will completely remove acetone solvent, whereas slightly higher ranges may be used for other solvents. In general, no more than 8% volatiles should remain in the paper after drying, with a preferred residual volatile content in the range of 3% to 5%. Residual volatile content, after normal drying, is measured by the weight loss observed on subjecting the dried paper to a temperature of 320° for 10 minutes.

These impregnated papers may be bent and rolled without cracking, and cut without flaking or chipping, and may be stored for prolonged periods without blocking or advancement in cure.

Decorative laminates can be prepared on almost any core material, of high, medium and low density, employing the process of this invention. Typical core materials include plywood, hardboard, particle board, cement-asbestos and gypsum board. All these boards should have plane and parallel surfaces, and uniform compressibility. The surface of the board to be coated should be sanded smooth if necessary. The board should either be thermally stable at the laminating tmeperature, or special precautions may be required; for example, if a urea formaldehyde resin binder is present, or the boards are of high moisture content, it is preferred to pre-dry the boards to a minimum moisture and volatile content. Since it is desirable to avoid steam formation and the formation of other volatiles during lamination, for example the calcining of gypsum board with heat, such boards should be pretreated before lamination.

To prevent warping, either the core material should be balanced with a resin surface on both sides, or the reverse side should be protected with some inexpensive resin film, typically a sheet of phenolic resin impregnated kraft paper with a glassine paper separator. The type and character of the core material used in the decorative laminate will determine the extent to which balancing or equalization is required. All types of hardboard and most plywoods must be balanced to a greater or lesser degree to compensate for the slight resin shrinkage that occurs in the decorative face and to equalize the rate of water absorption through the two faces. Boards which have a high internal bond strength and a high resistance to moisture do not require extensive balancing. Certain types of particle board, particularly those with high resin content outer faces, or wood veneered faces, may not require additional equalization.

Laminating may be accomplished using a standard platen press with multiple openings. Layers of decorative board can be cured either "face-to-face," using a polishing plate finished on both sides, or "back-to-back" using two polishing plates, each finished on one side only. Either stainless steel or aluminum cauls, of any desired finish, are normally used. The cauls should be "broken in" by the use of an external mold release on the first several pressings. Thereafter no external release is necessary during a continued operation.

The impregnated paper is laminated to the board at a temperature and pressure and for a time sufficient to convert the diallyl phthalate to a thermoset resin. The laminating pressure need only be high enough to consolidate the resin and to provide small amounts of flow, and will depend upon such factors as the density and surface of the core and the flow characteristics of the impregnated paper. Pressures approaching contact pressure, and as high as 800 p.s.i., have been used successfully. At low laminating pressures diallyl phthalate resin flows sufficiently to produce a uniform finish of any desired gloss. For most laminates a convenient pressure is in the range of 100–250 p.s.i. Where maximum resin flow is required such as with rough veneered cores, best results are obtained when the laminating pressure is increased to about 250–300 p.s.i. If it is desired to laminate at pressures in excess of 350 p.s.i., it may be advisable to use paper in which the resin flow has been retarded by advancing the cure of a small portion of the resin during the drying operation, since high laminating pressures are known to reduce the thickness of the resin film on the laminate. With impregnated papers containing less than about 63% resin for 3–4 mil paper, and 53% for 7–8 mil paper, no resin film at all is obtained, even at very low laminating pressures.

The curing temperature should be high enough to activate the catalyst, and to provide a reasonable rate of cure. For commercial operation, the shorter the curing cycle the greater the productivity, so that high curing temperatures are preferred from practical considerations. In practice the maximum laminating temperature is controlled by the stability of the core. Curing tmeperatures up to 400° F. for up to five minutes have been used without charring such core materials as "Masonite." Lower temperatures of course require a longer curing time, and temperatures as low as 200° F. have been used for prolonged periods. A temperature range of about 250° F. to 400° F. is preferred, and within this range the rate of polymerization is reasonable, with no significant decomposition and degradation of the laminates. It is not necessary to cool the cured laminate in the press before removal.

In preparing a laminate designed for use under especially rigorous conditions, such as for counter tops, an overlay paper may be used with the decorative paper. Overlay papers are unpigmented papers approximately 2–3 mils in thickness, and are impregnated and prepared for laminating as are the densified decorative papers, laid on top of the decorative paper in the laminating press, and cured and laminated simultaneously with and under the same conditions as the decorative paper. Because of their relative absorbency, overlay papers are normally impregnated to a resin content in the range of about 80–85%. Overlay sheets impart a total resin film of 6–10 mils above the surface of the decorative paper.

The laminates produced according to this invention have a flat, undistorted surface, since volumetric shrinkage is less than 1% in advancing from thermoplastic diallyl phthalate polymer to the fully cross-linked thermoset resin. The surfaces may have any desired finish, satin, gloss or flat, depending on the caul surfaces employed. The products have high dimensional stability, and outstanding resistance to abrasion, heat, wear, weathering, and the action of harsh chemicals.

The practice of this invention is illustrated further in the following examples. All parts are by weight unless otherwise indicated.

*Example I*

A typical diallyl phthalate thermoplastic polymer, used in this and the succeeding examples, was prepared as follows: 8860 pounds of monomer, 622 pounds of isopropanol (91% by volume) and 75 pounds of hydrogen peroxide (50.4% $H_2O_2$) were charged to a 1500 gallon stainless steel reactor, thoroughly agitated and heated to a pot temperature of 104–108° C. at total reflux. After 10 hours the viscosity of the reaction mixture had increased to 27 cps. at 106° C., as measured by a Bendix Untraviscoson computator. The batch was cooled, to obtain a reaction product having a viscosity of 425 cps. at 25° C. This polymeric reaction product, which consists of approximately 27% polymer, 67% unreacted monomer and 6% isopropanol, was mixed intimately with 48,000 pounds of isopropanol (91% by volume), and the converted polymer precipitated at 0° C. The solid polymer was separated by filtration and dried, to yield a 27.6% conversion of monomer to polymer. Properties of a polymer obtained by this process are:

PPV, cps. at 25° C. _____ 354
Softening range _____ ° C__ 80–105
Iodine No. _____ 55
Sp. gr. at 25° C. (ASTM D792–50) _____ 1.267

The PPV given above is the "precipitated polymer viscosity," the viscosity measured at 25° C. of a 25.0% solution of polymer in monomer.

The product is a thermoplastic solid possessing residual unsaturation. It is readily soluble in low molecular weight ketones, benzene, ethyl acetate and other solvents, and insoluble in alcohols, water and aliphatic hydrocarbons. This polymer was employed in the following examples:

*Example II*

A printed supercalendered alpha-cellulose paper of 8 mil thickness was coated by the "dip and flow" method, by passing at the rate of 10 feet per minute into a solution of the following composition:

| | Parts |
|---|---|
| Diallyl phthalate polymer | 93 |
| Diallyl phthalate monomer | 7 |
| Lauric acid | 3 |
| Tert.-butyl perbenzoate | 3 |
| Methyl ethyl ketone | 175 |

The coated paper was dried at 150° F. for 15 minutes, and then passed through the solution again, at the rate of 10 feet per minute. The paper was dried at 250° F. for 8 minutes, to produce a tack-free impregnated paper having a resin content of 56% and a volatile content of 4.5%. Resin content was measured by weighing samples of untreated and coated paper and assigning the weight gain as resin content. Percent volatiles was measured as the weight loss after heating for 10 minutes at 320° F. This paper was laminated to a core of ¼" thick three-ply all birch plywood which had been dried for 5 minutes at 350° F. The layup consisted of a slip caul (to protect the laminate from the surface of the press platen) a sheet of glassine separator paper, a balancing sheet of phenolic impregnated kraft paper, the plywood core, the diallyl phthalate impregnated decorative sheet, and a polished aluminum caul plate. The layup was cured in a laminating press by heating for 6 minutes at 340° F., under a pressure of 200 p.s.i. The resultant laminate showed good surface gloss and a smooth, even resin film 5.5 mils in thickness on the surface of the laminate.

*Example III*

A printed supercalendered absorbent paper, 4 mils in thickness, was impregnated by passing the paper once, at a rate of 5 feet per minute, into a solution of the composition:

| | Parts |
|---|---|
| Diallyl isophthalate polymer | 90 |
| Diallyl isophthalate monomer | 10 |
| Lauric acid | 3 |
| Tert.-butyl perbenzoate | 3 |
| Acetone | 150 |

The diallyl isophthalate was prepared following the procedure of Example I. The impregnated paper was dried at 190° F. for 15 minutes, to produce a tack-free paper having a resin content of 65% and a volatile content of 5.0%. This paper was laminated to a pre-dried core of Duolux tempered Masonite, a compressed hardboard 0.125 inch in thickness and having a density of 1.1 g./cc., which had been pre-dried for 5 minutes at 350° F., using mirror finish cauls in a layup as described in Example II for 20 minutes at 300° F. under a pressure of 200 p.s.i. Microscopic examination showed a resin film 5 mils in thickness in a polished section of this laminate. The 60° specular gloss of this sample was 80% based on black glass as 100%.

*Example IV*

A printed supercalendered alpha-cellulose paper of about 3.5 mil thickness was coated by passing the paper at the rate of 10 feet per minute into a solution of the following composition:

| | Parts |
|---|---|
| Dimethallyl orthophthalate polymer | 90 |
| Dimethallyl orthophthalate monomer | 7 |
| Lauric acid | 3 |
| Tert.-butyl perbenzoate | 3 |
| Acetone | 175 |

The dimethallyl phthalate was prepared following the procedure of Example I. The coated paper was dried at 150° F. for 14 minutes, and then passed through the solution again, at the rate of 10 feet per minute. The paper was dried at 250° F. for 8 minutes, to produce a tack-free impregnated paper having a resin content of 66.5% and a volatile content of 3.2%. The paper was laminated to a ⅝" thick medium density particle board which had been pre-dried for 10 minutes at 350° F. The layup was the same as in Example II. After a curing cycle of 10 minutes at 340° F. and 200 p.s.i. pressure a glossy finished laminate was obtained. Microscopic examination of polished sections of this laminate showed a uniform resin film of 6 mils in thickness across the face of the laminate.

*Example V*

A 4 mil printed supercalendered alpha-cellulose decorative paper was coated by passing at the rate of 10 feet per minute into a solution of the following composition:

| | Parts |
|---|---|
| Diallyl phthalate polymer | 92 |
| Diallyl phthalate monomer | 8 |
| Capric acid | 3 |
| Tert.-butyl perbenzoate | 3 |
| Methyl ethyl ketone | 160 |
| Toluene | 40 |

The coated paper was dried at 150° F. for 15 minutes, and then passed through the solution again, at the rate of 10 feet per minute, to produce a tack-free impregnated paper having a resin content of 66% and a volatile content of 4.0%. The paper was laminated to asbestos cement board of 3/16" thickness which had been pre-dried for one and one half hours at 350° F. The layup consisted of a slip caul, a sheet of glassine separator paper, a sheet of phenolic impregnated kraft paper, the board core, the diallyl phthalate impregnated decorative sheet, and a polished aluminum caul plate. The laminating cycle was 6 minutes at 380° F. and 200 p.s.i. pressure. The glossy laminate produced was found to have a uniform resin film approximately 5.5 mils in thickness on its surface.

*Example VI*

A printed supercalendered alpha-cellulose paper of about 7 mils thickness was coated by the "dip and flow" method, by passing at the rate of 10 feet per minute into a soluiton of the following composition:

| | Parts |
|---|---|
| Diallyl phthalate polymer | 95 |
| Diallyl phthalate monomer | 5 |
| Tert.-butyl peroxide | 3 |
| Acetone | 200 |

The coated paper was dried at 150° F. for 14 minutes, and then passed through the solution again, at the rate of 10 feet per minute. The paper was dried at 250° F. for 7 minutes, to produce a tack-free impregnated paper having a resin content of 54.0% and a volatile content of 4.5%. The paper was laminated to a core of Duolux tempered Masonite, which had been pre-dried for 5 minutes at 350° F., in a layup as described in Example I, using a mirror finish aluminum caul plate treated with silicone release agent. The layup was cured in a laminating press by heating for 20 minutes at 300° F., under a pressure of 350 p.s.i. The laminate was removed from the press and the cauls stripped off, to produce a smooth, mirror finish laminate. Microscopic examination of a polished section of this laminate showed a smooth, even resin coating of 3.5 mils thickness on the surface of the laminate.

*Example VII*

Alpha-cellulose overlay paper of about 3 mils thickness (basis weight 18 pounds per 3000 square feet) was coated by the "dip and flow" method, by passing at the rate of 15 feet per minute into a solution of the following composition:

| | Parts |
|---|---|
| Diallyl phthalate polymer | 93 |
| Diallyl phthalate monomer | 7 |
| Lauric acid | 3 |
| Tert.-butyl perbenzoate | 3 |
| Methyl ethyl ketone | 175 |

The coated paper was dried at 200° F. for 10 minutes, to produce a tack-free impregnated paper having a resin content of 82% and a volatile content of 4.2%. This paper was laminated in combination with the decorative paper described in Example VI, to a ¼" thick three-ply all birch plywood which had been dried for 5 minutes at 350° F. The layup consisted of a slip caul, a sheet of glassine separator paper, a balancing sheet of phenolic impregnated kraft paper, the plywood core, the decorative sheet, the overlay sheet, and a polished aluminum caul plate. The layup was cured in a laminating press by heating for 6 minutes at 340° F., under a pressure of 200 p.s.i. The resultant laminate showed good surface gloss and an 8 mil resin film over the printing on the decorative paper.

It is apparent that this invention is susceptible to numerous modifications within the scope of the disclosure, and it is intended to include such variations within the scope of the following claims.

I claim:

1. The method of producing decorative laminates which are characterized by a uniform resin coating about 3 to 6 mils in thickness, by laminating decorative paper to a rigid core material by the process which comprises the steps of impregnating a sheet of decorative paper about 3 to 8 mils in thickness, said decorative paper having been densified by the supercalendering process to a Gurley densometer reading of 250 to 450 seconds per 400 ml., with a solution comprising (a) diallyl phthalate, 90–98% of said diallyl phthalate being a thermoplastic diallyl phthalate polymer and the other 2–10% being diallyl phthalate monomer, (b) a catalytic amount of an organic peroxide and (c) a volatile solvent, and drying said impregnated paper until said paper is impregnated with a total of about 53% to 67% of diallyl phthalate, by weight of paper, and has a residual volatile content of less than about 8%, measured as material volatile after heating the dried paper for 10 minutes at 320° F.; and laminating the dried impregnated paper to the surface of said core material, at a temperature and pressure and for a time sufficient to convert the diallyl phthalate to a thermoset resin, thereby forming a laminate coated with a resin surface about 3–6 mils in thickness.

2. The method of producing decorative laminates which are characterized by a uniform resin coating about 3–6 mils in thickness, by laminating decorative paper to a rigid core material by the process which comprises the steps of impregnating a sheet of decorative paper about 3 to 4 mils in thickness, said decorative paper having been densified by the supercalendering process to a Gurley densometer reading of 250 to 450 seconds per 400 ml., with a solution comprising (a) diallyl phthalate, 90–98% of said diallyl phthalate being a thermoplastic diallyl phthalate polymer and the other 2–10% being diallyl phthalate monomer, (b) a catalytic amount of an organic peroxide, (c) an effective amount of a release agent and (d) a volatile solvent, and drying said impregnated paper, until said paper is impregnated with a total of about 63% to 67% diallyl phthalate, by weight of paper, and has a residual volatile content of 3% to 5%, measured as material volatile after heating the dried paper for 10 minutes at 320° F.; and laminating the dried impregnated paper to the surface of said core material, at a temperature and pressure and for a time sufficient to convert the diallyl phthalate to a thermoset resin, thereby forming a laminate coated with a resin surface about 3–6 mils in thickness.

3. The method of producing decorative laminates which are characterized by a uniform resin coating about 3–6 mils in thickness, by laminating decorative paper to a rigid core material by the process which comprises the steps of impregnating a sheet of decorative paper about 7 to 8 mils in thickness, said decorative paper having been densified by the supercalendering process to a Gurley densometer reading of 250 to 450 seconds per 400 ml., with a solution comprising (a) diallyl phthalate, 90–98% of said diallyl phthalate being a thermoplastic diallyl phthalate polymer and the other 2–10% being diallyl phthalate monomer, (b) a catalytic amount of an organic peroxide, (c) an effective amount of a release agent and (d) a volatile solvent, and drying said impregnated paper, until said paper is impregnated with a total of about 53% to 57% diallyl phthalate, by weight of paper, and has a residual volatile content of 3% to 5%, measured as material volatile after heating the dried paper for 10 minutes at 320° F.; and laminating the dried impregnated paper to the surface of said core material, at a temperature and pressure and for a time sufficient to convert the diallyl phthalate to a thermoset resin, thereby forming a laminate coated with a resin surface about 3–6 mils in thickness.

4. The method of producing decorative laminates which are characterized by a uniform resin coating about 6 to 8 mils in thickness above the surface of decorative paper, by laminating decorative paper coated with overlay paper to a rigid core material by the process which comprises the steps of (1) impregnating a sheet of decorative paper about 3 to 8 mils in thickness, said decorative paper having been densified by the supercalendering process to a Gurley densometer reading of 250 to 450 seconds per 400 ml., with a solution comprising (a) diallyl phthalate, 90–98% of said diallyl phthalate being a thermoplastic diallyl phthalate polymer and the other 2–10% being diallyl phthalate monomer, (b) a catalytic amount of an organic peroxide and (c) a volatile solvent, and drying said impregnated paper, until said paper is impregnated with a total of about 53% to 67% diallyl phthalate, by weight of paper, and has a residual volatile content of less than about 8%, measured as material volatile after heating the dried paper for 10 minutes at 320° F.; (2) impregnating a sheet of unpigmented overlay paper about 2 to 3 mils in thickness with the solution described in step (1), and drying said paper, until said overlay paper is impregnated with a total of about 80% to 85% diallyl phthalate, by weight of paper, and has a residual volatile content of less than about 8%, measured as material volatile after heating the dried paper for 10 minutes at 320° F.; (3) laying the impregnated overlay paper on the impregnated decorative paper which is laid directly on the core material; and (4) laminating the decorative paper and the overlay paper to the surface of said core material, at a temperature and pressure and for a time sufficient to convert the diallyl phthalate to a thermoset resin, thereby forming a laminate coated with a resin surface about 6 to 8 mils in thickness above the surface of the decorative paper.

References Cited by the Examiner

UNITED STATES PATENTS

| | | | |
|---|---|---|---|
| 2,443,736 | 6/1948 | Kropa. | |
| 2,463,856 | 3/1949 | Dickerman | 156—281 |
| 2,482,142 | 9/1949 | Chidester et al. | 161—263 |
| 2,712,514 | 7/1955 | English | 156—281 |
| 3,049,458 | 8/1962 | Willard | 161—165 |

EARL M. BERGERT, *Primary Examiner.*